United States Patent [19]

Shen

[11] Patent Number: 5,211,856

[45] Date of Patent: May 18, 1993

[54] METHOD OF OIL/WATER SEPARATION AND DEVICE FOR PURIFICATION OF OIL

[76] Inventor: Hanshi Shen, Shanghai Petro-Chemical Complex, Research & Development Dept. Jin Shan Wei, Shanghai, China

[21] Appl. No.: 846,940

[22] Filed: Mar. 6, 1992

[51] Int. Cl.[5] .............................................. B01D 17/02
[52] U.S. Cl. ..................... 210/799; 210/774; 210/776; 210/175; 210/180; 210/220; 55/55; 55/189
[58] Field of Search ..................... 210/776, 205, 416.1, 210/500.1, 258, 800, 220, 219, 181, 195.1, 175, 799, 218, 180, 221.2, 774; 261/DIG. 47, DIG. 70; 55/55, 189

[56] References Cited

U.S. PATENT DOCUMENTS

| | | | |
|---|---|---|---|
| 1,247,541 | 11/1917 | Jones | 261/DIG. 70 |
| 2,152,863 | 4/1939 | Bills | 210/800 |
| 2,947,525 | 8/1960 | Klein | 261/DIG. 70 |
| 3,396,950 | 8/1968 | Wood | 261/DIG. 70 |
| 3,841,997 | 10/1974 | McGee | 210/220 |
| 4,631,134 | 12/1986 | Schüssler | 261/DIG. 70 |
| 4,684,467 | 8/1987 | Cloud | 210/800 |
| 4,696,684 | 9/1987 | Shen | 55/89 |
| 4,986,903 | 1/1991 | Canzomeri et al. | 210/199.1 |
| 5,133,882 | 7/1992 | Stearns | 210/776 |
| 5,156,745 | 10/1992 | Cairo, Sr. et al. | 210/779 |

OTHER PUBLICATIONS

"It Pays for Itself with the Oil it Saves", 1987, Hilliard Corp.

Primary Examiner—Robert A. Dawson
Assistant Examiner—Ana M. Fortuna
Attorney, Agent, or Firm—Birch, Stewart, Kolasch & Birch

[57] ABSTRACT

This invention provides a new low vacuum oil/water mixture liquid separation method and an improved oil purification device for oil/water separation. Fully diffused purified gas is introduced into an oil/water mixture liquid in a low vacuum container, enabling the liquid to produce concentrated micro fine gas bubbles, enabling in the liquid to be in a state of gas/liquid two-phase mixture. This greatly increases the surface area of the oil/water mixture liquid, speeding up the oil/water separation. This invention provides an oil/water separation rate ten times higher than that of the conventional method. This invention is not only suitable for the purification of new oil, but is adequate in the recovery, regeneration and purification of various waste lubrication oils, hydraulic oils, and transformer oils.

8 Claims, 4 Drawing Sheets

METHOD OF OIL/WATER SEPARATION AND DEVICE FOR PURIFICATION OF OIL

BACKGROUND OF THE INVENTION

1. Field of the Invention

This invention involves a low vacuum high-speed method for oil/water separation for mixture liquids or emulsions liquids of oil and water, as well as a device for purification of oil for low vacuum separation of oil/water and oil/gas, mainly used in industrial oils: the refinement of fresh oils as well as the recovery, regeneration and refinement of industrial waste oils.

2. Description of Related Art

With the speedy development of science, technology and industries, the demands of the degree of purification and refinement for industrial oils, such as lubrication oils, hydraulic pressure oils, and transformer oil, are becoming increasingly strict and the amount of oils consumed also grows daily. Subsequently, in industries, the refinement of fresh oils not only has to be up to the stipulated standards, but the discarding of waste oils is not permissible by environmental laws and the law on the utilization of resources as well. Furthermore, this is also impractical in consideration of production cost. Thus, the recovery, refinement and regeneration of huge amounts of waste oils are involved; the waste oils are made to reach the stipulated standards for use. In addition, when being used, the oils are also being contaminated at a high speed. Therefore, for oils in the process of being used, continuous purification is also needed to ensure normal operation of the equipment.

In the process of being used, contamination of the oils can produce great damage. For example, in hydraulic pressure systems, the rate of accidents caused by the contamination of oils can reach as high as 82%, while for electric and mechanical systems, only 18%. When transformer oils become off standard, the transformer will be in danger of being punctured.

The most harmful contaminants in oils are: water, gases, solid particles, and the like among which water can reduce the viscosity of the oils, thus making the oils out of conformity with the usage demand, water can also lower the membrane strength of the oils or break the oil membrane, resulting in accelerated wear and tear of the equipment; water and air can make the requisite chemical additives in oils become ineffective, producing acidic substances and speeding up the aging of the oils. While in operation, the life span of waterless transformer oil is 5.6 times that of water-containing transformer oil. As for hydraulic pressure systems, water and air enhance the gas hole phenomenon, thus affecting the stability, increasing the vibration and noises of the system, shortening the life span of the equipment, and even creating accidents.

The water in oils is not only very harmful, but to separate it from the oils is also rather difficult. For oils with higher viscosity, when oil and water mixes, and when the mixture undergoes agitation during the equipment's operation, the mixture rapidly emulsifies; separation of the water from the oils at this state is even more difficult, especially the oils containing various chemical additives. The additives strengthen the oil/water emulsification, and this enhances the difficulties of separation. For example, there has not been a good device up to the present that can quickly separate the water from the hydraulic pressure oil. Besides, in the field of the purification of oils, the purification is usually being conducted by adopting chalk, silica gel, or activated carbon. However, when the water content is high, water can quickly render these absorbents ineffective. Therefore, it is necessary to first eliminate the greater part of the water.

Thus, the separation of oil/water is both very important and very difficult. The technology of low vacuum separation of oil/water and oil/gas as well as well as of the purification of oil has long been emphasized by people in the field of industry. There are many conventional devices in this respect, most adopting methods like these: pass the oil/water mixture (including emulsion) liquid through the spray element which is deposited at the top of the vacuum container or column, spray it into fine drops, then fall onto the filler or grid at the lower part, thus increasing the areas of interface of the two gas/liquid phases of the liquid, at the same time the resulting droplets are obstructed by the filler, thus prolonging the retaining periods of the liquid droplets or the thin liquid layers in space. The chances for the evaporation of the water in the oil are thus increased. Because the saturated steam pressure of the oil is very low, under this state, the oil evaporates very little, resulting in the gas and part of the water being separated under a low pressure, thus achieving the goal of oil/water separation and oil/gas separation. Finally, the oil or oil/water liquid falls to the lower part of the container, which is pumped or extracted to enter into the spray element again for recycle dewatering.

From the theory of mass transfer, it is known that the separation of oil/water is actually the evaporation of one component that is easier to evaporate in a two component mixture liquid. Under definite temperature or pressure (or in vacuum), it is required that the liquid possess the biggest possible interface areas of the two gas/liquid phases, therefore, the longer the liquid droplets or the liquid thin layers remain in the gaseous phase the better, the two gas/liquid phase interfaces should speedily renew. Only thus can the water in the oil/water mixture liquid be quickly separated out of the mixture. However, in the above conventional method using spray and filler there exist the following deficiencies: First, the capability of the spray plus filler to increase the interfaces of the two phases of liquid/gas is limited; second, the capability of the filler in obstructing, thus delaying the liquid from falling is even more limited; third, as the viscosity of oil increases, the surface of the oil is difficult to be renewed. These three factors limit the oil/water separation speed of the above conventional method.

The object of this invention is to provide a new method for the separation of oil and water, which differs from the conventional method in that oil and water can be rapidly separated under the same temperature and absolute pressure (vacuum); it also provides low vacuum oil/water separation, oil/gas separation using said method, as well as a device for the purification of oil.

SUMMARY OF THE INVENTION

The object of this invention is realized through the following technical process:

Introduce into the oil/water mixture or emulsion liquid a gas that has been purified; make the gas fully diffused in the liquid, forming a large amount of concentrated and very fine gas bubbles, thus making the liquid be in a 2-phase mixed state. The method of diffusing the gas is to pass the gas through a bubble generator made of microporous materials. The materials that manufacture the bubble generator are powdered sintered metal, powdered sintered ceramics, press-shaped powdered plastics, press-shaped powdered resin, multilayer net cloth or other micro porous materials. The structures of the bubble generator are vacant sphere, vacant bar, vacant ring, and vacant plate, shaped. The direction of movement of the gas is: After the gas is introduced into the chamber of the bubble generator, pass through the inner surface of the micro porous wall to the outer surface, subsequent to which it enters the liquid proper, forming concentrated fine bubbles. As the liquid is in a low vacuum container, the absolute pressure of the liquid is very low, resulting in bubble expansion immediately upon their arrival in the liquid and further expansion in the process of floating upward. The absolute pressure within the gas bubbles being much lower than the saturated steam pressure of water as well as the separation pressure of the gas in the oil, the water content in the oil unceasingly evaporates into the gas bubbles. Gas is also separated into the gas bubbles finally, when the gas bubbles reach the top part of the liquid, they break; finally, the steam and gas are discharged from the vacuum outlet of the container. At this state, as the saturated steam pressure of the oil is very low, the oil evaporates but little, thus achieving the aim of the separation of the oil/water and the separation of oil/gas.

The two-phase mix state of the gas and liquid in the oil/water mixture liquid makes water evaporate rapidly under low vacuum conditions, the mechanism of which lies in:

1. Huge amounts of gas bubbles are dispersed in the liquid, resulting in the great increase of the two-phase interfaces of the gas and liquid. This is incomparable by the method which employs fillers to increase the surface area of the liquid.

2. The movements of matter are all relative. If one point on a certain floating-upward bubble is taken as a reference coordinate initial point, then, in this coordinate system, the floating-up bubble may seem to be not moving but the liquid surrounding the bubble seems to be dropping down continuously. This is to say, though the height of the container or column is very limited and unchanged, the relative movements between the gas bubbles and liquid will proceed continuously provided that the gas bubbles are continuously produced and floating-up. Therefore, if only the period for the production of gas bubbles is made to be sufficiently long, then the period of the liquid's remaining in space is equivalent to being sufficiently long, and the water in the oil will continuously evaporate into the bubbles. Any conventional methods employing fillers to obstruct the falling of the liquid to prolong the remaining period of the liquid in space can not be compared with this one.

3. As the gas bubbles remain in the stage of continuously expanding and floating upward, the liquid surrounding the gas bubbles at any instant is different. That is, the two gas/liquid phase interfaces are being rapidly renewed continuously. The difficulties of the large viscosity of the liquid as well as of the surfaces being hard to renew are overcome. The renewal of the liquid surface enables the exposure of the water molecules on to the surface, thus speeding up evaporation. The conventional methods can not be compared with this.

From the above analysis of the mechanism, the differences and superiority are obvious when adopting the gas/liquid mixed two-phase method as compared with the conventional spray plus filler method.

It can easily be seen that the gas/liquid mixed two-phase method for the separation of oil/water mixture liquid as provided by this invention can also be used in: rapid evaporation and separation of the component(s) easier to be evaporated in two-component or multi-component mixtures, and such industrial areas as the evaporation of liquids, as the concentration of salt solutions, etc.

This invention also provides improvements for separation and purification devices of low vacuum oil/water separation and oil/gas separation featuring the above mentioned gas/liquid mixed two-phase method. The following are elucidation for the respective procedure together with its device:

The system of the method of this invention comprises five parts: (1) the low vacuum container, (2) the gas bubble producing system procedure, (3) the input procedure of oil/water mixture liquid, (4) the vacuum exhaust procedure, (5) the output procedure of purified oil. The five parts are respectively described as follows:

(1) The low vacuum container or column

The low vacuum container or column can be divided into two kinds: single-chamber type or multi-chamber type. The single-chamber is one container or column which has only one chamber. The multi-chamber type means: first, several single chamber containers or columns are serially connected together, that is, the oil/water mixed liquid continuously flows starting from the entrance of the first container or column and reaching its exit, and this exit is the entrance of the second container or column, and so on and so forth, until the liquid reaches the exit of the last container or column. Several single containers or columns in series form a combined unit. Secondly, there are several partitions in a big container or column, these partitions not only divide the big chamber of the container or column into several small chambers, but the liquid also continuously flows starting from the entrance of the first small chamber and reaching its exit, and this exit is the entrance of the second small chamber where the liquid enters, and so on and so forth, until the liquid reaches the exit of the last small chamber. The big container or column is the collective body of several serially connected small chambers. Thirdly, several containers or columns are parallel-connected, which means there is a general liquid entrance pipe-line connecting with several parallel sub-pipe lines which are linked with the liquid entrance of the respective container or column. There is also a general exit pipe-line for the purified oil which gas several sub-pipe lines parallel-connected with it and which is linked with the purified oil exit of the respective container or column. Several containers form a container combination connected in parallel. In performance, while the oil/water mixture liquid enter one or one part of the containers or columns, oil/water separation is being carried on simultaneously in the second or second part of the containers or columns, and the third or third part of the containers or columns is discharging purified oil at the same time. After the third or the third part of containers or columns has finished the discharging of the purification of the oil, the process is changed into the procedure of inputting the oil/water mixture liquid. Simultaneously the first or the first part of the containers or columns change into the oil/water separation procedure and the second or second part of containers or columns changes into the discharging of purified oil. Changes like this are being proceeded in turn; the oil/water mixture liquid may also be introduced continuously into the combination body of the containers connected in parallel or columns and the body continuously discharges the purified oil. There is an appropriate amount of space at the top part of each of the container or column and its chamber which is connected with the vacuum port to discharge steam and gas. Except for the discharge port, there are several gas bubble generators in the container or column and its chamber, thus making the liquid change into the state where the two phases of gas and liquid mix together. The work vacuum of the container or column and its chamber is between 700 mmHg and $1 \times 10^{-3}$ mmHg. The function of the vacuum container or column and its chamber is such that water and gas are separated and discharged under the two-phase state of gas and liquid being mixed together.

(2) The procedure of gas bubble generating system

This system includes two parts. The first is the gas treating and supplying part, providing gas that conforms with the requirements, including gas source, gas intercept valve, gas filter, gas dryer, gas heater, gas current regulating valve, gas intercept valve and the corresponding pipes that connect them. The second is several bubble generators and the pipes that connect with the gas supplying part. Among them, the gas treating and supplying part is on the outside of the container or column and its chamber, while the gas generators and their gas pipes are in the inside of the container or column and its chamber, and its connecting pipes pass through the wall of the container or column and connects with the supplying part. The bubble generators shall be guaranteed to be immersed in the liquid. The function of this procedure is to make the liquid in the container or column and its chamber reach a state of gas/liquid two-phase mixture.

(3) The procedure of the input of the oil/water mixture liquid

This procedure is similar to the conventional low vacuum oil purification device, comprising of the following parts: inlet valve, coarse oil-filter, input pump, pump safety valve, oil heater, oil temperature controller, fine oil-filter, precision switch of the pressure difference of the fine oil-filter, flow regulation valve, intercept valve and the corresponding pipes that connect them. It communicates with the inlet of the input chamber of the vacuum container or column. The function of this procedure is to provide the container or column and its chamber with a definite amount of oil/water mixture liquid with adequate temperature and at the same time filter away a greater part of the solid particles.

(4) The procedure of vacuum exhaust

The procedure is similar to the low vacuum exhaust procedure of the conventional low vacuum oil purification device, comprising the following parts: vacuum meter, vacuum exhaust valve, condenser, water storage tank, vacuum pump and the corresponding pipes that connect them. It connects with the vacuum port of the container or column and its chamber. The function of the condenser is to condense the steam into water, after which water enters the water storage tank, thus preventing the steam from entering the vacuum pump and influencing normal operations, while the gas is removed by the vacuum pump. The function of this procedure is: on the one hand, a definite vacuum is maintained in the vacuum container or column and its chamber, and, on the other hand, steam and gas are exhausted.

(5) The procedure of output of purified oil

This procedure is also similar to the output procedure of the conventional low-vacuum oil purification device. The procedure is connected by passing the output port of the vacuum container or column and its chamber, through the intercept valve, output pump, safety valve of the pump, reverse direction valve, fine oil-filter, flow regulating valve, flow meter, intercept valve and the corresponding connection pipes. The function of this procedure is: further filter away the solid particles in the oil; discharge purified oil which conforms with the standards in water and in gas content and in solid particle contamination.

BRIEF DESCRIPTION OF THE DRAWINGS

Illustrations of the attached drawings are as follows.

The following are further detailed illustration of this invention referring to the attached drawings and examples:

DESCRIPTION OF PREFERRED EMBODIMENTS

Figure 1:
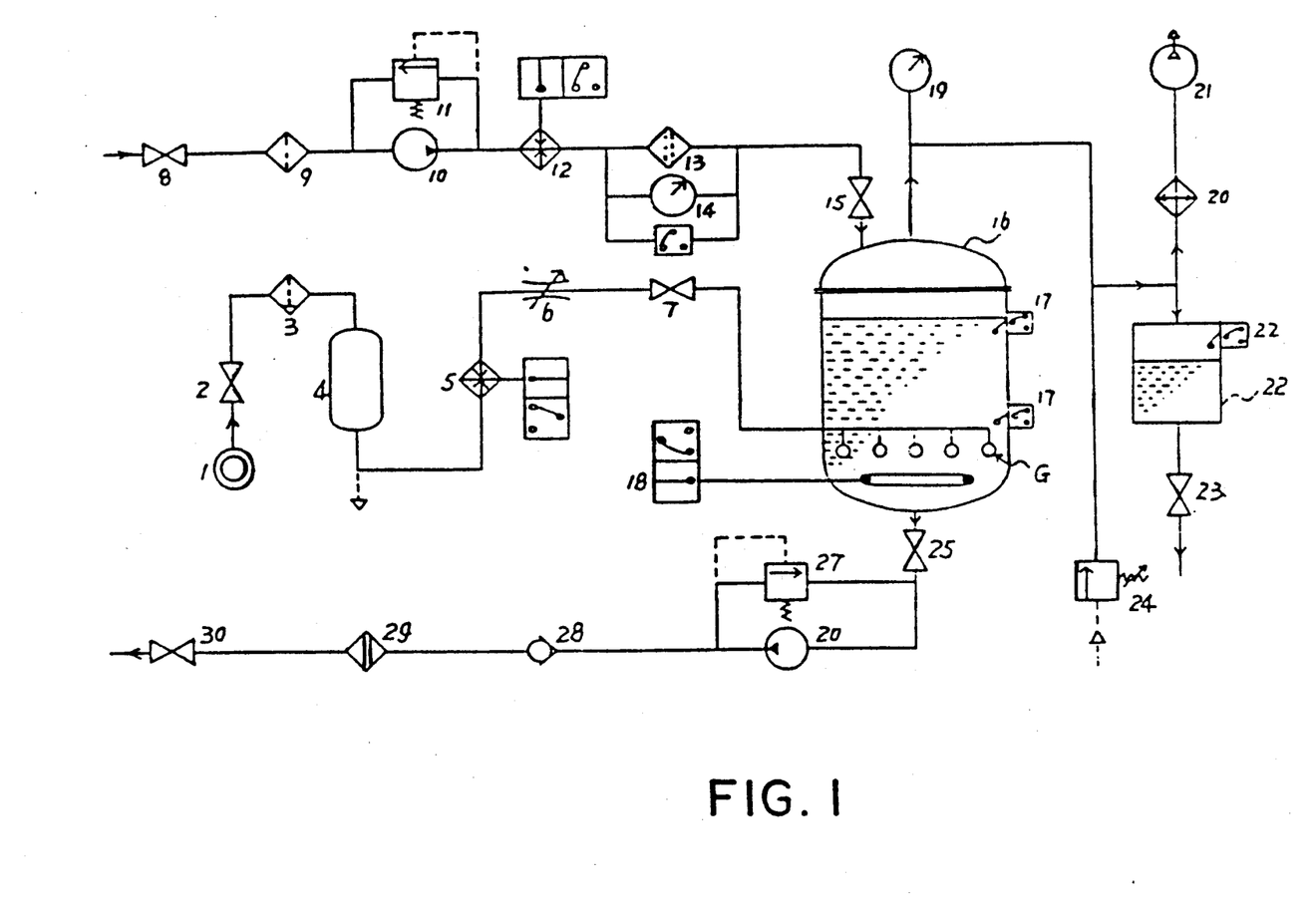
FIG. 1 is a schematic view of the procedures of a low vacuum oil purification device of a single-chamber type with intermittent treatment.

1. Low vacuum oil purification device of single-chamber type with intermittent treatment FIG. 1 is a schematic view of the procedures of a low vacuum oil purification device of a single chamber type with intermittent treatment, comprising: a single-chamber type low vacuum container, a procedure of gas bubble generating system, a procedure of input of oil/water mixture liquid, a procedure of vacuum exhaust, and a procedure of purified oil output. The respective parts and performance procedures are introduced as follows:

(1) Single-chamber type low vacuum container or column

In FIG. 1, element 16 is a cylindrical upright sealed container; the bottom is the discharge port of purified oil; located at the bottom is the oil heater 18 and the corresponding oil temperature controller; a little above 18 are several (only five are shown in the figure) hollow sphere-shaped bubble generators G which are circularly arranged. A little above G is a controller 17 for the lower liquid surface; a controller 17 is to the upper liquid surface, the function of which is to prevent the liquid from being added to the top part of container 16, thus maintaining a suitable space at the top part of the container and to prevent the liquid from discharging from the vacuum port while letting the steam and gas to discharge from the vacuum port. The vacuum port is located at the highest part of container 16. The working vacuum of the container is between 110 mmHg and 260 mmHg.

(2) The procedure of the gas bubble generating system

Figure 2:
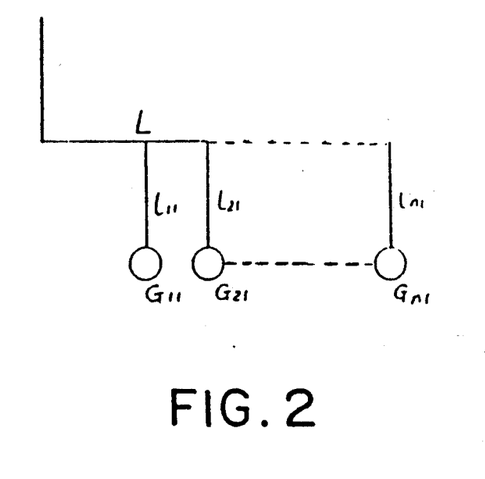
FIG. 2 is a front schematic view of the rectangular arrangement of the hollow sphere-shaped gas bubble generator.
Figure 3:
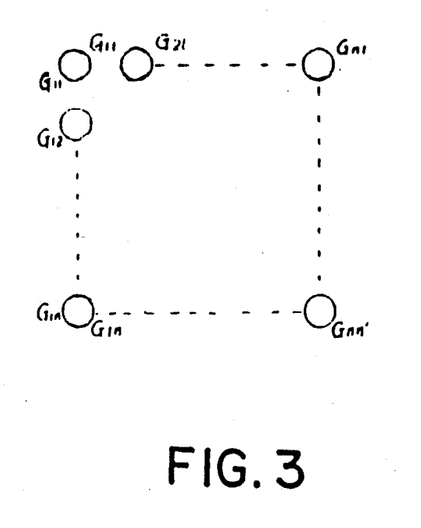
FIG. 3 is a schematic top view of the rectangular arrangement of the sphere-shaped gas bubble generator.
Figure 4:
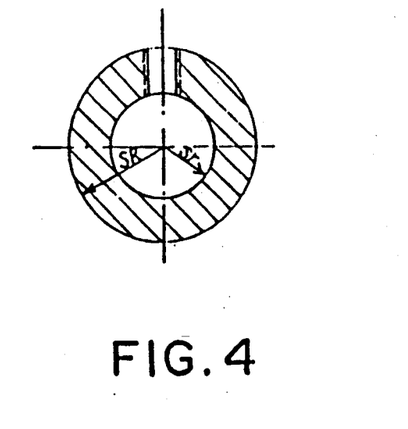
FIG. 4 is a sectional schematic view of the center of the sphere-shaped gas bubble generator.

The gas bubble generators are the key part of this invention and more detailed description is necessary. FIG. 2 is the front schematic view of the rectangular arrangement of the hollow sphere-shaped gas bubble generators. In the figure, $G_{11}, G_{21} \ldots G_{n1}$ are sphere-shaped bubble generators, L is the general gas-communicating pipe, $l_{11}, l_{21} \ldots l_{n1}$ are parallel sub-pipes connecting the gas bubble generators with the general pipe. FIG. 3 is a top schematic view of the rectangular arrangement of the sphere-shaped gas bubble generators. In the figure, $G_{11} G_{12} \ldots G_{1n}$, up to $G_{n1} G_{n2} \ldots G_{nn}$, are the respective gas bubble generators. FIG. 4 is a sectional schematic view of the center of the sphere-shaped gas bubble generator, in which Sr is the inner diameter of the hollow sphere, while SR is the outer diameter of the sphere. A rectaugular arrangement only is shown here, which is more suitable to be arranged in horizontally positioned cylindrical containers. For the above-mentioned upright cylindrical containers, a circular-shaped arrangement is more suitable.

In FIG. 1, the general gas-communicating pipe penetrates the container wall and connects with the intercept valve of the gas treatment and supply part. The gas treatment and supply part comprises: a gas source 1, an intercept valve 2, a gas filter 3, a gas dryer 4, a gas heater and its temperature controller 5, a gas regulating valve 6, a gas intercept valve 7 and their corresponding connecting pipes. The gas starts from gas source 1, respectively passes through 2, 3, 4, 5, 6 and 7 and enters into the hollow chamber of the respective gas bubble generators G. The temperature of the gas is the same as that of the oil.

(3) The input procedure of the oil/water mixture liquid

In FIG. 1, the contaminated oil containing solid particles and water successively enters from intercept 8 into the procedure, flowing through coarse oil filter 9, input pump 10, heater and its temperature controller 12, fine oil filter 13 and intercept valve 15, then entering container 16. The function of the coarse filter 9 is to protect pump 10, and to share the amount of the contaminants to be filtered with fine filter 13. A safety valve 11 is provided for pump 10. Heater 12 raises the temperature of the liquid and controls the temperature within an allowable range. Fine filter 13 filters the greater part of the solid particle from the liquid. Coarse filter 9 and fine filter 13 realizes the first step of purification—the elimination of solid particles. Element 14 is pressure difference switch; when the contamination amount is too big for fine filter 13, the pressure differences increase, thus triggering pressure difference switch 14; this makes the whole device stop its operation until the filter core is changed or cleaned, and then the device is started again. The intercept valve 15 closes when the charging of oil is stopped to protect the vacuum of container 16.

(4) The procedure of vacuum exhaust

The gas penetrates through the micro pores in the wall of gas bubble generator G and enters into the liquid. As the liquid is in the vacuum container, therefore it is in a state of low pressure. The fine gas bubbles in the liquid expand, and float up during this process. As the absolute pressure within the gas bubbles (actually the gases in bubbles are also in a state of vacuum) is far lower than the saturated steam pressure and the separation pressure of the gas in the oil, the water content in the oil continuously evaporates into the gas bubbles, and the gas also enters into the gas bubbles. When the gas bubbles float up to the place 17' having the liquid pressure, the gas bubbles will break, and the steam and gas will exhaust from the vacuum port of container 16.

In FIG. 1, element 19 is a vacuum pressure meter. The gas and steam discharged from the vacuum port at the top of container 16 arrive in condenser 20. The greater part of steam is condensed into water, flowing downward into water storage tank 22 while the gas is exhausted by vacuum pump 21. Element 22 is the liquid surface controller for water storage tank 22. When the water level reaches the controller 22, controller 22' and is triggered. Vacuum pump 21 stops operating, valve 23 opens to discharge water.

(5) The procedure of the output of purified oil

In FIG. 1, the longer the period for the vacuum separation procedure for gas/liquid two-phase mixture, the lower the water content in the oil. If the gas treatment and supply part can provide enough dry gas, then the water content in the oil can be lowered at will with the prolongation of the treatment period, and can be as low as below 1 ppm. When the water content in the oil reaches the stipulated standard, valve 7 closes. From 1 to 2 minutes afterwards, after the remainder gas is exhausted, vacuum pump 21 closes, opening the vacuum gas filling valve 24 that connects with gas dryer 4 makes container 16 recover pressure. When intercept valve 25 that protects the vacuum extent in container 16 is open purified oil is discharged through oil output pump 26, reverse-checking valve 28 and again through fine oil filter 29 for further filtering, and purified oil is discharged from output intercept valve 30. The purified degree of the solid particle of the oil depends upon the precision grade of the fine oil filters 13 and 29.

(6) The work procedure of the device

The work begins when the oil/water mixture liquid enters the procedure, the lower surface controller 17 is triggered, at this time the procedures of gas bubble generating system and vacuum exhaust simultaneously start working. When the liquid arrives at 17' the upper surface controller 17' is triggered, the oil input procedure stops working, and the intercept valve 15 closes. When the water content of the oil reaches the designated water content level, the gas generating system stops working, and valve 7 closes. One and two minutes later, the vacuum exhaust procedure stops working at the same time gas-filling valve 24 opens and container 16 is filled with gas and recovers pressure. At this time, the purified oil output procedure starts working, discharging purified oil until container 16 is exhausted.

Figure 5:
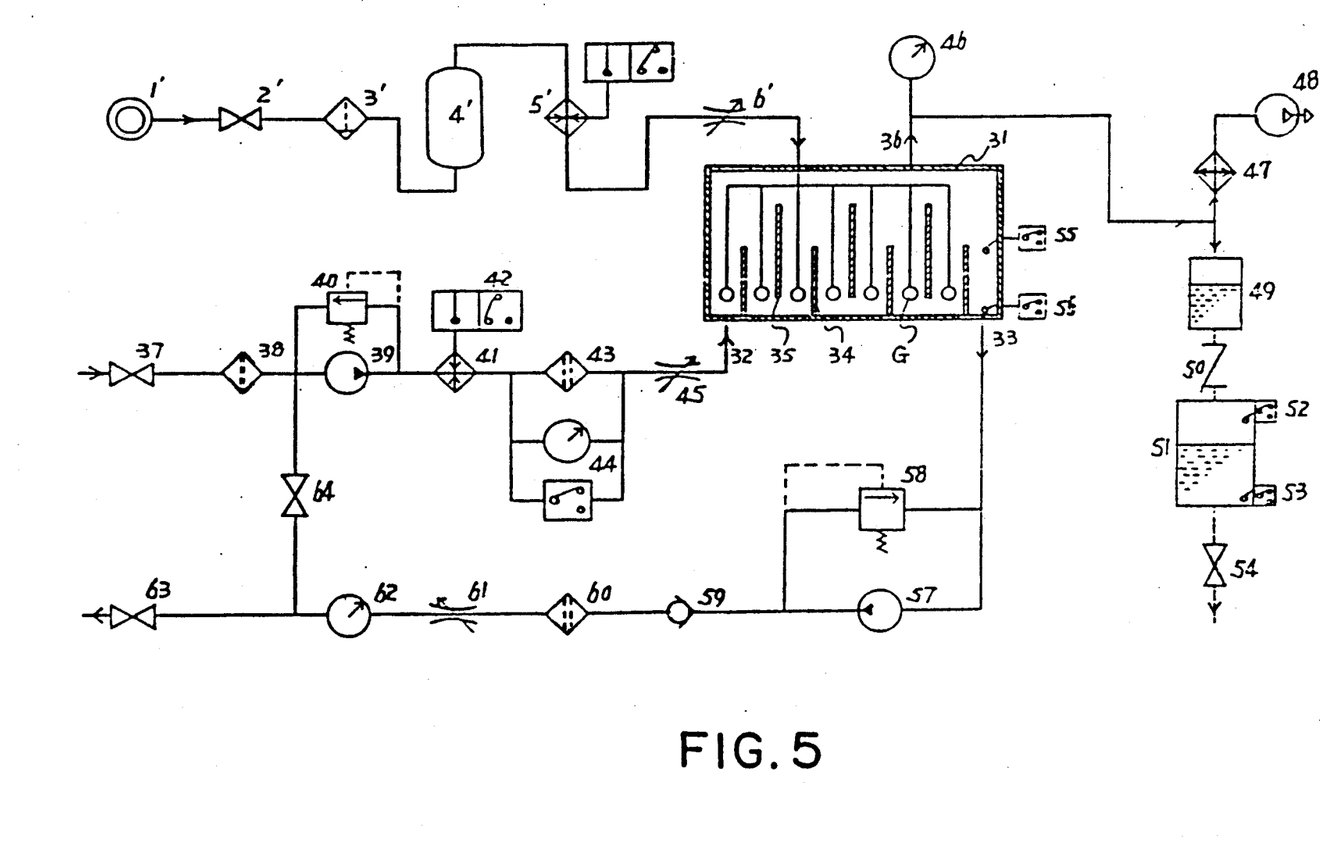
FIG. 5 is a procedure schematic view of the low-vacuum oil purification device of a multi-chamber type with continuous treatment.

2. Multi-chamber type low vacuum oil purification device with continuous treatment FIG. 5 is a schematic view of the procedure of this device; different parts and the work procedure are illustrated as the following:

(1) Multi-chamber type low vacuum container

Figure 6:
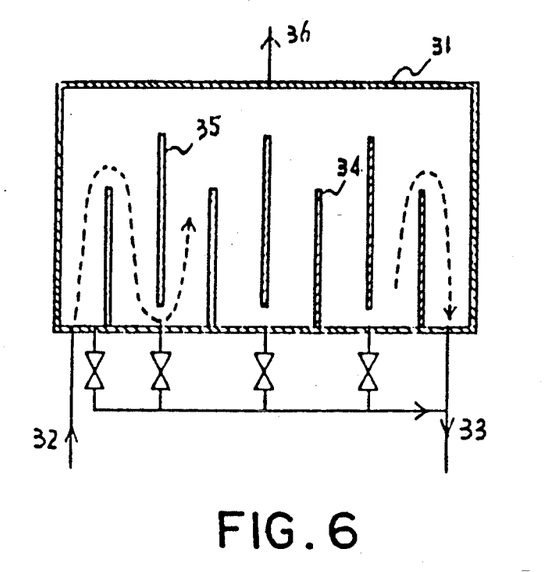
FIG. 6 is a front schematic view of a multi-chamber type container.

FIG. 6 is a front schematic view of a multi-chamber type container. In the FIG. 31 is the wall of the horizontal cylindrical container. Element 32 is the input port of the oil/water mixture liquid. Element 33 is the output port of the purified oil. Member 34 is the lower partition board, 35 is the upper partition board, and 36 is the vacuum port. At the lowest part of the container there are four valves used for exhaust during change of oil or cleaning, and they all communicate with output port 33.

Figure 7:
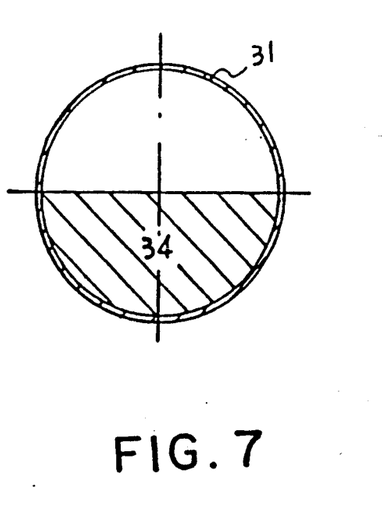
FIG. 7 is a side view of the lower partition board.
Figure 8:
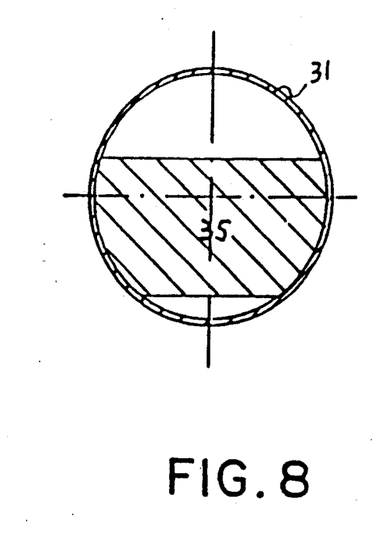
FIG. 8 is a side view of the upper partition board.

FIG. 7 is a side view of the lower partition board. In the FIG, 31 is the container wall, and 34 is the lower partition board. The top empty part of board 34 is the discharge route for the steam and gas. The left side of the partition is a little higher than the right, thus preventing the oil/water mixture liquid from reversely flowing back to the left again after overflowing to the right. FIG. 8 is a side schematic view of the upper partition board. In the FIG, 31 is the container wall, and 35 is the upper partition board. The top empty part is the discharge route of the steam and gas, while the lower empty part is the route for oil/water mixture liquid. The upper partition board is higher than any of the lower partition boards. There are altogether four lower partitions and three upper partitions. The big container 31 is partitioned into eight small chambers, forming a multi-chamber type container. The oil/water mixture liquid enters from inlet 32, then advances forward along the arrow of the dotted line (as illustrated in FIG. 6), flowing through the first small chamber on the left, overflowing the top of the first lower partition board into the second small chamber, i.e. the outlet of the first small chamber on the left is the inlet of the second small chamber, and so forth and so on, until the outlet 33. Obviously, the respective small chamber is serially connected.

The above description of FIGS. 6,7 and 8, the structure of the multi-chamber container 31 in FIG. 5 is easy to understand. In order to simplify FIG. 5, the exhaust valves at the lower part of container 31 are not marked in the figure. In FIG. 5, the gas bubble generators G are arranged at the lower part of all seven small chambers on the left. Referring to container 31 as a whole, they are arranged in a rectangle (refer to FIGS. 2 and 3). The general gas-communication pipe penetrates through the container wall and connects with valve 6' at outside of the gas treatment and supply part. In FIG. 5 element 55 is the controller of the upper liquid surface and, 56 is the controller of the lower liquid surface. The working vacuum of the container is between 260 mmHg and $1 \times 10^{-}$ mmHg.

Acted on by the large amount of gas bubbles, part of the water in the oil/water mixture liquid is evaporated as it passes through each of the small chambers and is exhausted from vacuum port 36. The nearer the small chamber to the output port the lower the water content of oil is. Therefore, the greater the number of chambers, the higher the precision of the oil/water separation is. In addition, the lower the flow rate or the smaller the flow speed through the small chamber, the higher the precision of the separation is. In this way, even if the water-content of the oil/water mixture liquid is very high, if the liquid is consecutively passing through the multi-chamber type container, the water-content in the oil can still reach the stipulated standard when it reaches the outlet.

(2) The procedure of the gas bubble generating system

In FIG. 5, the gas treatment and supply part includes: gas source 1', intercept valve 2', gas filter 3', gas dryer 4', gas heater and its temperature controller 5', gas regulating valve 6' and their corresponding pipes that connect them. Valve 6' connects with the general gas pipe, that comes out from container 31. The temperature of the input gas is the same as that of the input oil in container 31.

(3) The procedure of the input of oil/water mixture liquid

In FIG. 5, the procedure of the continuous input includes: intercept valve 37, coarse oil filter 38, oil pump 39, safety valve 40, oil heater 41, oil temperature controller 42, fine oil filter 43, pressure difference switch 44, flow regulating valve 45 and the corresponding pipes that connect them. Regulating valve 45 connects with inlet 32. Aside from flow regulating valve 45, the function of respective parts is similar to the input part of single-chamber type container. Through the flow regulating of valve 45, the separation precision of oil/water separation of container 31 is chosen.

(4) The procedure of the continuous output of purified oil

In FIG. 5, the procedure of the continuous output of purified oil includes: output pump 57, safety valve 58, checking reverse valve 59, fine filter 60, flow regulating valve 61, flow meter 62, discharge valve 63 and the corresponding pipes that connect them. The entrance of output pump 57 connects with the exit 33 of container 31. The function of flow meter 62 is to measure the treated amount. The function of flow regulating valve 61 is: when controller 55 of the upper surface of the liquid is triggered, the flow rate of valve 61 can be regulated to a larger amount, thus avoiding the liquid being much higher than the top end of the respective lower partition board. When the controller 56 of the lower surface of the liquid is triggered, the flow rate of valve 61 can be regulated to a smaller amount, thus avoiding pump 57 from pumping nothing and affecting its life-span and assuring the continuous discharge. That is to say, pump 61 is to make the flow input of the device match the flow output, ascertaining that the device operates continuously and normally. The function of the other parts are similar to those of the single-chamber type container.

(5) The procedure of the vaccum continuous exhaust

In FIG. 5, 46 is the vacuum meter. After the steam and in the respective chamber have reached the upper space of container 31, they pass into vacuum port 36, then to condenser 47. The steam is exhausted from vacuum pump 48, the water in the condenser flows downward to the sub-water storage tank 49, then further lower down past the two-site two-pass valve 50 into the main water storage tank 51. When the water level of the main water storage tank 51 reaches the upper liquid level controller 52, controller 52 is triggered, causing valve 50 to close and the two-site two-pass valve 54 to open, so that water flows out through valve 54. As valve 50 is closed at this time, therefore the discharge of water does not affect the working vacuum of container 31. When the water level is lowered to the lower liquid level controller 53, controller 53 makes valve 54 close and valve 50 open again. Water discharge like this assures the continuous performance of container 31.

(6) The work procedure of the device a) The preheat procedure of the device

The input procedure, the gas bubble generating system and the vacuum exhaust system begin to work at the same time, when the oil surface reaches the upper level surface controller 55, valve 64 opens, at the same time valves 37 and 63 close, and the output procedure simultaneously begins to work. In this interval, the device enters into the work state of cycle preheating.

b) Work procedure of normal performance

When the temperature of the vacuum container is near that of the oil, valves 37 and 63 open while valve 64 closes. At this time, if the upper liquid surface controller is in the state of being triggered, the flow rate of valve is increased. If the lower liquid surface controller is in the state of being. triggered, the flow rate of valve 61 decreases, slightly making the input and output flow rate to match each other. It is at this period that normal operation is reached.

The device of this invention characterized in that:

1) As there are no spray parts and fillers in this device, no strict demand is required for the viscosity of the oil, it has greater applicability.

2) As there are no spray parts, there is no clogging of materials and other easily damaged parts. Therefore maintenance is easy.

3) If the definition $$\beta = \frac{\text{water content in oil at entrance}}{\text{water content in oil at exit}}$$

is taken to describe the oil/water separation performance of the device, the $\beta$ value of this device can not only be decided at the time of design, but also the range of $\beta$ value to be regulated is very large for designing finalized device 4) For oil with high viscosity and high water content, the average $\beta$ value of the conventional spray plus filler method is only between 1.2 to 3, while that of the device of this invention can reach 20-100, or even higher.

5) For oil with high viscosity and high water content, only one treatment by the device of this invention can arrive at the stipulated purity standard, there is no necessity to recycle a number times and to take a long time to reach the purity standard.

6) The noises made by the single-chamber type intermittent treatment low vacuum oil purification device is far lower than those made by the conventional devices.

7) In the multi-chamber type continuous treatment low vacuum oil purification device, as passing the oil mixture liquid only once through the device can reach the purity standard, and the purification can be carried out continuously, the device can easily be connected onto the production assembly line of oil-production or oil purification/refinement. With the other conventional devices, many recycles are necessary to arrive at the purity standard, thus it is difficult for them to be connected onto the production assembly line.

8) The inventor adopted an experimental low vacuum oil purification device similar to the single-chamber type intermittent treatment device as shown in FIG. 1. Hydraulic oil, the water content of which was 10,000 ppm, was being treated after being completely emulsified for oil/water separation in the device. Half an hour later, the water content in oil was lowered to 88 ppm and the $\beta$ value was 113. Among the more advanced devices in the prior art, for hydraulic oil with 10,000 ppm water content, 4-6 recycle treatments were carried out during the time interval of around two hours, and the water content was only lowered to 500 ppm. If four recycles were taken into consideration, the value was 2.12. The ratio of the two $\beta$ values was over 50 times.

This fully explains the superiority and the active effects of this invention.

We claim:

1. A method for separating a liquid oil/water mixture under vacuum, comprising the steps of:

introducing purified and fully diffused gas into the liquid oil/water mixture to produce a large amount of concentrated fine gas bubbles;

turning the liquid oil/water mixture into a gas/liquid two-phase state, thus speeding up the oil/water separation process.

2. The separation method of claim 1, wherein the gas is introduced into the oil/water mixture by gas bubble generators made by microporous material, passing the gas from an inner wall of gas bubble generators, penetrating through the large amount of concentrated micropores of the wall, reaching the outer wall of the gas bubble generator, entering into the liquid, and enabling the liquid to produce large amounts of concentrated micro gas bubbles.

3. The oil/water separation method of claim 2, wherein the microporous materials that made up said gas bubble generator are selected from the group consisting of powdered sintered metal, powdered sintered ceramics, press-forming powdered plastics, press-forming powdered resins, and multi-layered net cloth.

4. A specialized device for separating a liquid oil/water mixture comprising:

a) a low vacuum container or column;

b) a gas bubble generating system, including a purified gas source, a heater, valves, a gas bubble generator, and pipes that connect the respective parts in turn;

c) means for inputting and filtering the oil/water mixture liquid, including: oil filters, liquid transporting pumps, heaters, valves, and pipes that connect the respective parts;

d) a low vacuum exhaust including vacuum pumps, condensers, water storage tanks, valves, and pipes that connect the respective parts;

e) means for outputting and refiltering the purified oil, including: liquid transporting pumps, valves, pipes that connect the respective parts, and oil filters serially connected in the pipes of said means for outputting;

a plurality of gas bubble generators evenly distributed in said gas bubble generator or column, each gas bubble generator being connected in parallel by subpipes with a main pipe, the main pipe penetrating through to an exterior of the container or column wall to connect with the outlet of the gas bubble generating system;

a liquid inlet in said container or column, connecting with said means for inputting and filtering;

a vacuum exhaust port provided on the top of said container or column, connecting with an input end of said low vacuum exhaust;

a liquid output port at the lower part of said container or column, connecting with the input end of said means for outputting and refiltering.

5. The specialized device of claim 4, wherein there is only one low vacuum container or column and there is only one chamber in the container or column.

6. The specialized device of claim 4, wherein the low vacuum container or column is composed of several containers or columns connected in parallel into a container group or column group.

7. The specialized device of claim 4, wherein said low vacuum container or column is composed of several containers or columns serially connected into a container group or column group.

8. The specialized device of claim 5 or 7, wherein said container or column is partitioned by partition boards into a plurality of small chambers, each chamber of said plurality of chambers being serially connected with the others, making the container or column into a multi-chamber type collective body.

* * * * *